United States Patent [19]
Nagano et al.

[11] 4,406,357
[45] Sep. 27, 1983

[54] DAMPER DISK

[75] Inventors: Tamio Nagano, Hirakata; Yoshio Nishimura, Neyagawa, both of Japan

[73] Assignee: Kabushiki Kaisha Daikin Seisakusho, Osaka, Japan

[21] Appl. No.: 229,943

[22] Filed: Jan. 30, 1981

[30] Foreign Application Priority Data

Feb. 6, 1980 [JP] Japan .................................. 55-13981

[51] Int. Cl.³ .......................... F16D 3/14; F16D 3/66
[52] U.S. Cl. .................................... 192/106.2; 464/68
[58] Field of Search ......................... 192/106.2; 464/68

[56] References Cited

U.S. PATENT DOCUMENTS 2,745,268 5/1956 Reed .............................. 192/106.2 X
3,931,876 1/1976 Beeskow .......................... 192/106.2
3,948,373 4/1976 Worner ............................. 192/106.2
4,036,341 7/1977 Beeskow et al. .................. 192/106.2
4,122,931 10/1978 Maucher ........................... 192/106.2

Primary Examiner—Allan D. Hermann
Attorney, Agent, or Firm—Burns, Doane, Swecker & Mathis

[57] ABSTRACT

A damper disk comprises a pair of side plates at both sides of a flange of a hub splined to an output shaft. Both side plates and the flange are connected each other through torsion springs. One or a pair of sub-plates are disposed between the flange and the side plates. Both side plates are connected together by a stop pin which extends through notches in the flange and the sub-plates. The notches in the sub-plates are shorter than the notch in the flange. Frictional force between the flange 2 and the sub-plate is set stronger than that between the side plates and sub-plates. According to the invention, hysteresis torque changes during torsional operation, thereby, noises during idling of the engine as well as acceleration can be prevented.

5 Claims, 6 Drawing Figures

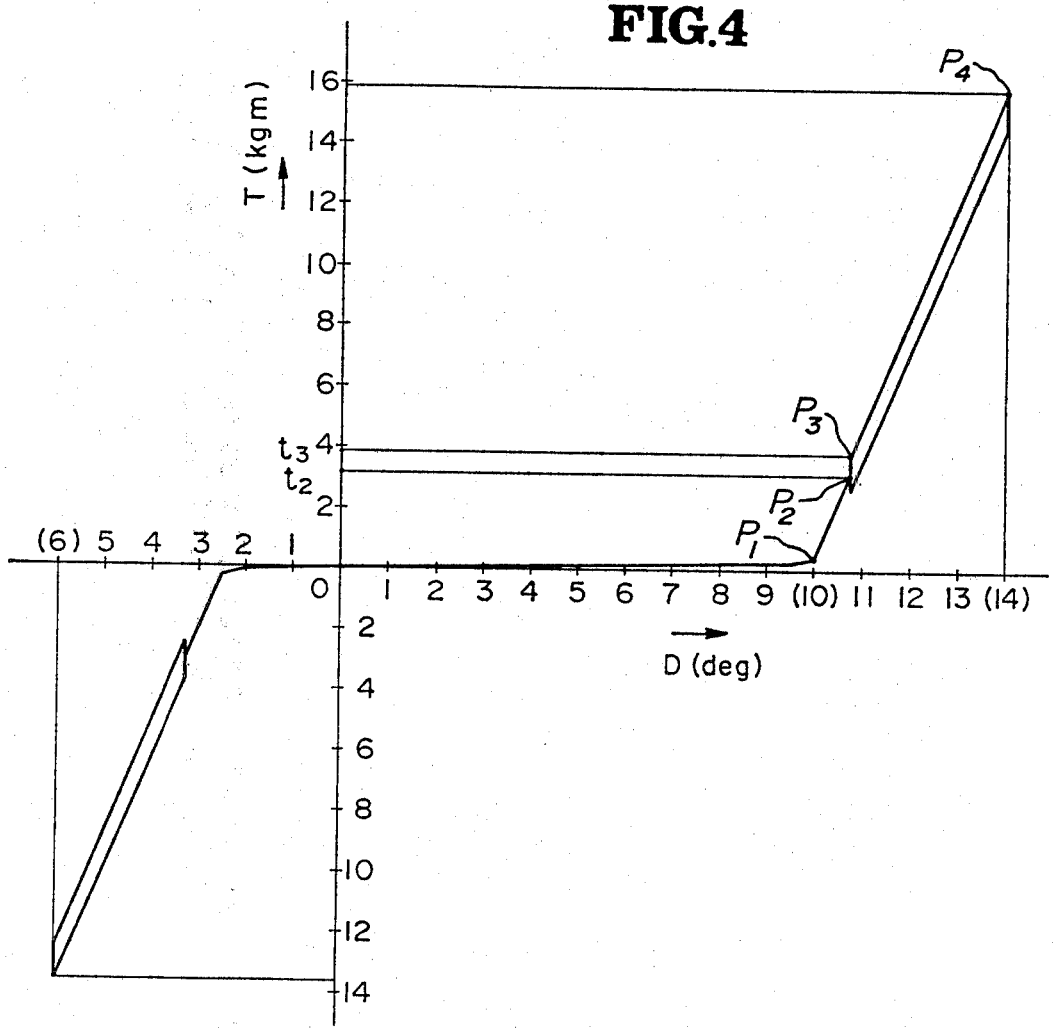

DAMPER DISK

This invention relates to a damper disk appicable to a friction clutch disk and also applicable to a damper arranged between a marine engine and a reduction gear mechanism for absorbing vibration.

In a conventional type of friction clutch, an annular clutch plate and retaining plate are arranged at both sides of a radial flange of a hub splined to an output shaft. Facing means for frictional engagement is connected to the outer portion of the clutch plate by means of cushioning plates, and the clutch plate and retaining plate are connected to the hub-flange by means of torsion-springs. Further the clutch plate and retaining plate are connected to the flange by means of annular friction members arranged between said plates and said flange. In this construction, when the torsion springs are compressed by torque transmitted therethrough, the clutch plate and retaining plate twist (or torsionally turn) with respect to the hub-flange. By said twist or torsion of the plates, relative sliding occur on the surfaces of the friction members, which produces hysteresis torque in the torsional operation, and thereby, torque vibration can be absorbed or damped. However, in this conventional type of the clutch, as the friction members are formed by merely annular friction washers and a cone spring, and each of the pressed surfaces of the friction members slides in constant force throughout the twisting operation, the hysteresis torque does not change throughout the twisting operation. Therefore, torque vibration can not be effectively absorbed, and it is impossible to surely prevent the noise during acceleration of the engine and the noise caused by impact of gear teeth during idling.

It is an object of the invention to provide an improved damper disk, wherein hysteresis torque changes during twisting operation.

With this object in view, the present invention provides a damper disk comprising a radial flange formed on the outer periphery of a hub splined to an output shaft; a pair of side plates disposed at both sides of the flange; openings formed in the flange and the side plates, said openings registering in axial direction of the disk; torsion springs disposed in the openings; a stop pin connecting the radially outer portion of the side plates; a sub-plate disposed between the flange and at least one of the side plates; notches formed in the flange and the sub-plate, through which said pin extends with spaces therebetween in rotating direction, the notch in the sub-plate is shorter than the notch in the flange; frictional force between the flange and the sub-plate is set stronger than that inside the side plates.

The invention will be described further, by way of example, with reference to the accompanying drawings; in which:

FIG. 4 is a graph explaining the relation between torque and torsion.

Figure 1:
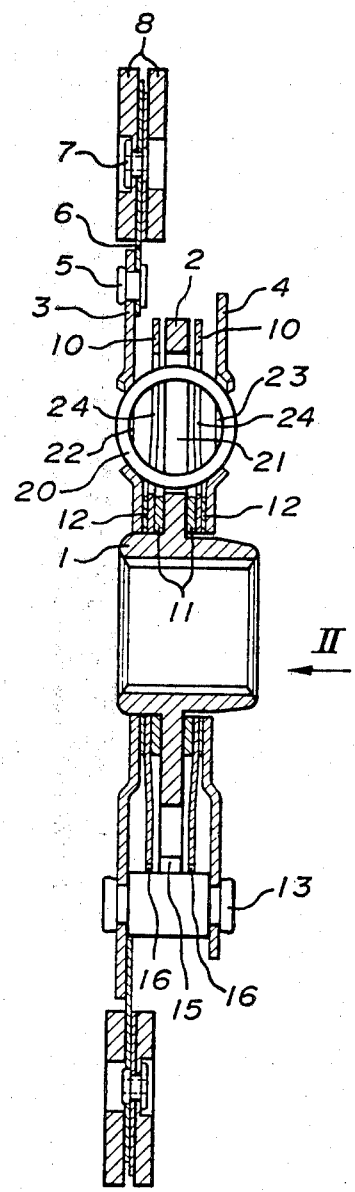
FIG. 1 is a sectional view of a clutch disk employing the invention.
Figure 2:
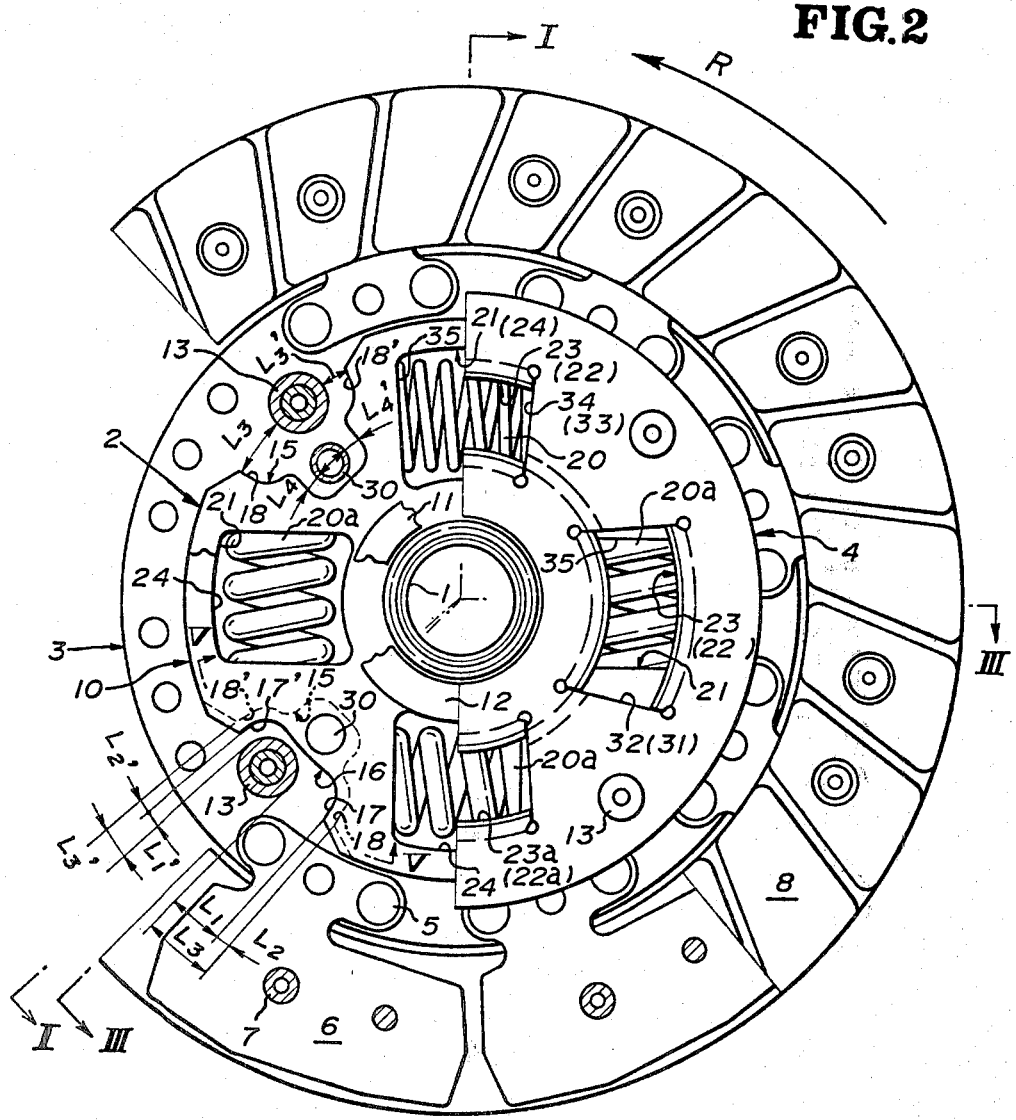
FIG. 2 is a partial view viewed along an arrow II in FIG. 1 with a certain parts eliminated for clarification.

Referring to FIG. 1, a splinehub 1 splined to an output shaft (not shown) has a radial flange 2 on its outer periphery, and an annular clutch plate 3 (side plate) and an annular retaining plate 4 (side plate) are fitted onto the outer periphery of the hub 1 with the flange 2 therebetween. Cushioning plates 6 are fixed at the radially outer portion of the clutch plate 3 by means of rivets 5. A pair of annular facings 8 and 8 are fixed at both surfaces of the plates 6 by means of rivets 7. A pair of annular sub-plates 10 and 10 are disposed between the flange 2 and each of the plate 3 and 4. A friction washer 11 is disposed between the radially inner portion of the flange 2 and each of the sub-plates 10 and 10, and wave springs 12 and 12 are disposed respectively between the clutch plate 3 and the adjacent sub-plate 10 as well as between the retaining plate 4 and other sub-plate 10. The outer portions of the clutch plate 3 and retaining plate 4 are rigidly connected each other by stop pins 13 which extend through recesses or notches 15 and 16 formed in the outer peripheries of the flange 2 and the sub-plates 10 and 10. The flange 2 is connected to the clutch plate 3 and retaining plate 4 by means of coil springs 20 (torsion springs) and 20a (FIG. 2). Each of the coil springs 20 and 20a, extends in the circumferential direction of the disk (in other words, perpendicularly with respect to the sheet of FIG. 1), and is disposed in openings 21, 22, 23, and 24 and 24, or 21, 22a, 23a, 24 and 24 formed in the flange 2, clutch plate 3, retaining plate 4 and both sub-plates 10 and 10, and registering in the axial direction of the disk (in other words, widthwise with respect to the sheet of FIG. 1).

Referring to FIG. 2, in the clutch disk according to the embodiment, three strong (hard) springs 20a and one weak (soft) spring 20 are disposed with circumferential equal spaces respectively therebetween. The circumferential length of each opening 21 of the flange 2 is equal to that of each opening 24 of the sub-plates 10 and 10, and is also equal to those of the openings 22 and 23 of the clutch plate 3 and retaining plate 4 into which the weak spring 20 is fitted. Other openings 22a and 23a for the strong springs 20a are circumferencially longer than the openings 21 of the flange 2.

Said notches 15 and 16 for the stop pins 13 extend in the circumferencial direction of the disk. In the position, as illustrated in FIG. 2, wherein the clutch plate 3 does not twist or torsionally turn with respect to the flange 2, circumferential spaces $L_1$ and $L_1'$ are formed between each stop pin 13 and side edges 17 and 17' of each notch 16 of the sub-plates 10 and 10, and circumferential spaced $L_3$ and $L_3'$ are formed between each stop pin 13 and side edges 18 and 18' of each notch 15 of the flange 2. The spaces $L_3$ and $L_3'$ are longer than the spaces $L_1$ and $L_1'$ by the spaces $L_2$ and $L_2'$ respectively.

Figure 3:
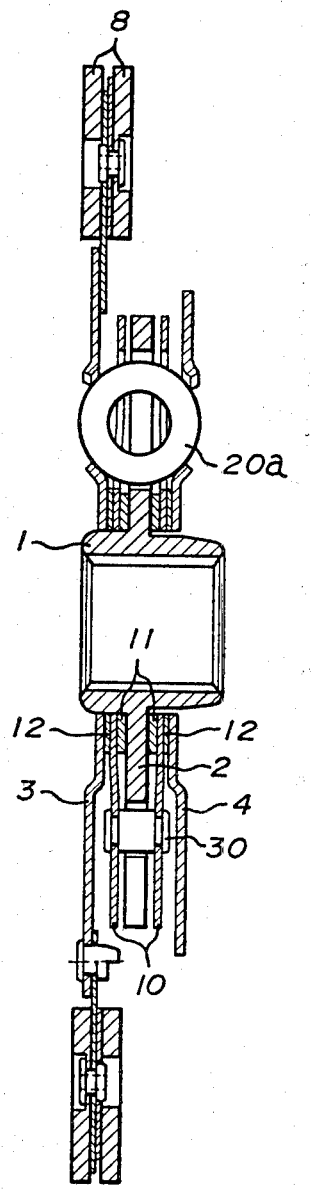
FIG. 3 is a sectional view taken along line III—III in FIG. 2.

Referring to FIG. 3, both sub-plates 10 and 10 are rigidly connected to each other by rivets 30. When the sub-plates 10 and 10 were set free before connected each other by the rivets 30, each sub-plate 10 and a sectional shape that was flat or conical. When it was conical, the radially outer portion of each plate 10 was more distant from the flange 2 than the inner portion. The sub-plates 10 and 10, which were formed as stated above, are rightly tied to each other by rivets 30, so that frictional force between each sub-plate 10, friction washer 11 and the flange 2 is set stronger than that between each sub-plate 10, wave spring 12 and one of the clutch plate 3 and retaining plate 4. As shown in FIG. 2, each rivet 30 extends through the inner portion of the notch 15 in the flange 2. Spaces $L_4$ and $L_4'$ are formed between each rivet 30 and the side edges of each notch 15. The spaces $L_4$ and $L_4'$ are longer than or equal to said spaces $L_3$ and $L_3'$ in the torsional degree or angle.

Operation is as follows. In the situation, as illustrated in FIGS. 1–3, that torsion angle D (see FIG. 4) is 0°, when the facings 8 and 8 are pressed to a flywheel (not shown) of a engine by a pressure plate (not shown), torque in the direction R in FIG. 2 is transmitted to the clutch plate 3. While the torque is extremely little, there occurs no sliding relative to the pressed surfaces of the wave springs 12 and 12 in FIG. 1. Therefore the torque is transmitted from the plates 3 and 4 to the flange 2 through the wave springs 12 and 12, sub-plates 10 and 10 and washers 11 and 11, and further to the hub 1 and output shaft, without compression of the springs 20 and 20a, thus, the plates 3 and 4 do not twist with respect to the flange 2. This operation is not shown in FIG. 4, because the torque T transmitted during the above operation is extremely little.

When the torque T exceeds said extremely little value, relative sliding occurs on the pressed surface of each wave spring 12, whereby, the plates 3 and 4 twist with respect to the flange 2, and the coil springs 20 and 20a are compressed, through which the torque is transmitted. While the torsion angle D is less than or equal to 10° (in section between O and $P_1$ in FIG. 4), each spring 20a in FIG. 2 is not pressed by side edges 31 and 32 defining each rear, in the rotating direction R, of three sets of openings 22a and 23a of the clutch plate 3 and retaining plate 4, and only one spring 20 is pressed by side edges 33 and 34 defining rears, in the direction R, of the openings 22 and 23. Thus, in section O-$P_1$ in FIG. 4, the torque T is transmitted from the side edges 33 and 34 of the openings 22 and 23 in the plates 3 and 4 to an edge 35 of the opening 21 in the flange 2 through only one weak spring 20 of four springs 20 and 20a. Therefore, a rate of increase of the transmitted torque T with respect to the torsion angle D is little as shown in FIG. 4. When the torsion angle D exceeds 10° ($P_1$–$P_4$), three springs 20a are pressed by the side edges 31 and 32 of the openings 22a and 23a of the plates 3 and 4, and the torque is transmitted to the flange 2 from the plates 3 and 4 through three strong springs 20a as well as through the spring 20 as stated above. Thus, an incline of the line between $P_1$ and $P_2$ in FIG. 4 increases.

The following operation can be obtained during the above operation. While the torsion angle D is less than 11° (O–$P_1$–$P_2$), sliding occurs only on the surfaces of the wave springs 12 and 12 in FIG. 5, and no sliding occurs on the surfaces of the friction washers 11 and 11 having big friction force. Therefore, the sub-plates 10 and 10 do not torsionally travel with respect to the flange 2, and only the clutch plate 3 and retaining plate 4 twist in the direction R with respect to the flange 2.

Figure 5:
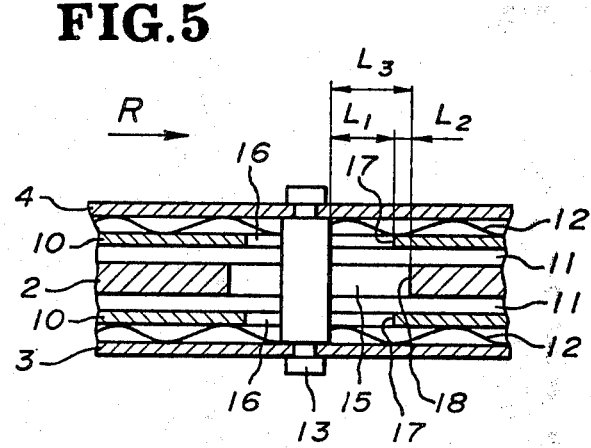
FIG. 5 is a sectional and schematic view taken along line V—V in FIG. 3.

When the torsion angle D reaches 11° ($P_2$ in FIG. 4) after each pin 13 in FIG. 5 fixed to the plates 3 and 4 travelled the space $L_1$, each pin 13 contacts with the side edge 17 of each notch 16 of the sub-plates 10 and 10, and thereafter, the sub-plates 10 and 10 travel together with the plates 3 and 4, so that some of the torque is transmitted to the flange 2 from the plates 3 and 4 through the pins 13, the sub-plates 10 and 10, and the friction washers 11 and 11. While the torque T is increasing from a value $t_2$ corresponding to the point $P_2$ to a rather big value $t_3$ ($P_3$), no sliding occurs on the surfaces of the washers 11 and 11, and the torsion angle D does not increase. When the torque T exceeds the value $t_3$, sliding occurs on the surfaces of the washers 11 and 11, and the sub-plates 10 and 10 twist together with the plates 3 and 4 with respect to the flange 2. By this sliding, second hysteresis occurs in the twisting operation, in other words, in the relation between the torque T and the torsion angle D. The second hysteresis is big because the frictional force on the washers 11 and 11 is set big as stated hereinbefore.

When the torsion angle D reach 14°, the pins 13 contact with the side edges 18 of the notches 15 in the flange 2, therefore, further torsion is prevented.

In the area of negative torque shown in the left and lower portion in FIG. 4, each member operates similarly as above, and an incline of the torsion operation line changes, and the hysteresis torque also changes during the the torsional operation.

According to the invention, as detailed hereinbefore, while the torsion angle D is little, the sliding occurs between the plates 3 and 4 and sub-plates 10 and 10, and while the torsion angle D exceeds a predetermined value (e.g. 11°), the sliding occurs between the sub-plates 10 and 10 and the flange 2, so that the hysteresis torque changes during the torsional operation. Therefore, the noise during acceleration of the engine and the noise caused by impact of gear teeth can effectively be prevented.

The degree, e.g. 11°, in which second hysteresis starts to occur, is determined by the space $L_1$ (or $L_1'$) between each stop pin 13 and side edge 17 (17') of each notch 16 in the sub-plates 10 and 10, and can be determined without a relation to the degree (e.g. 10°) in which the strong springs 20a start to operate (or to be compressed). Therefore the most suitable angle or period for the second hysteresis torque can be determined without regard to the springs 20a.

As the frictional force between the plates 3 and 4 and sub-plates 10 and 10 is little, and the first hysteresis torque is little, the noise caused by the impact of gear teeth during idling (during the transmission of little torque) can effectively be prevented. On the other hand, as the frictional force between the flange 2 and the sub-plates 10 and 10 is big, and the second hysteresis torque is big, the noise during acceleration (during the transmission of big torque) can also effectively be prevented.

As the sub-plates 10 and 10 can be shaped by punch machine, manufacturing thereof is easy. Further, as the portion at which each stop pin 13 presses is the side edges 17 and 17' in the sub-plates 10 and 10, the side edges 17 and 17' are not bent, and high durability can be obtained. This and aforementioned advantage will become more apparent by comparison to a disk in FIG. 6 which has already been proposed as a disk capable of changing the hysteresis torque.

Figure 6:
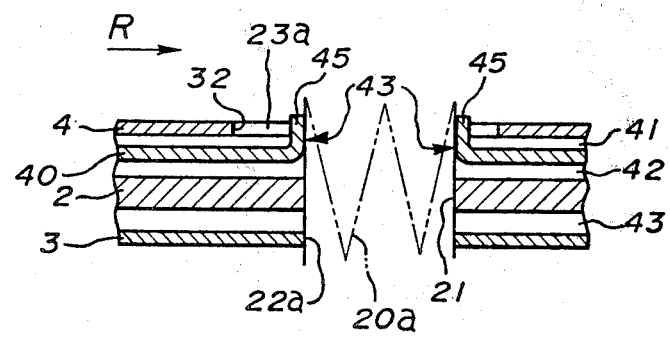
FIG. 6 is a fragmentary sectional view of a clutch disk different from the invention.

Referring to FIG. 6, one sub-plate 40 is employed and disposed only between a hub-flange 2 and a retaining plate 4. Friction members 41 and 42, which are friction washers or the like, are disposed respectively between the sub-plate 40 and the retaining plate 4 and between the sub-plate 40 and the flange 2. The sub-plate 40 is provided with an opening 43 having same length as an opening 21 of the flange 2 in circumferential direction (widthwise in the sheet of FIG. 6). Side edges 45 and 45 are bent and enter into an opening 23a of the retaining plate 4. In this construction, while the torsion angle is little, sub-plate 40 travels together with the flange 2, thus, sliding occurs between the retaining plate 4, the friction member 41 and the sub-plate 40. While the torsion angle exceeds a predetermind value, one of the bent edges 45 and 45 presses an edge 32 of the opening 23a, thus, sliding occurs between the sub-plate 40, the friction member 42 and the flange 2.

However, in the construction in FIG. 6, the side edge 45 of the sub-plate 40 comes in contact at the side edge 32 of the opening 23a at the same time as the second spring 20a starts to be compressed, so that the period for the second hysteresis coincides with the period while the spring 20a is compressed. Therefore it is impossible to freely determine the period for the second hysteresis without regard to the spring 20a, and it is hard to obtain most suitable hysteresis.

As pressing force against both friction members 41 and 42 are same each other, frictional force of both friction members 41 and 42 is substantially same each other. Therefore, in such case that the frictional force of the member 41 is set little, the noise during idling can effectively be prevented, however, as the frictional force of other member 42 is also set little, the noise during acceleration can not effectively be prevented. And in such case that the frictional force of both members 41 and 42 is set big, a disadvantage contrary to the above occurs.

As the side edges 45 and 45 shoud be formed by bending, machining cost of the sub-plate 40 is high. Further, as the bent side edge 45 is pressed against the side edge 32, the bent portion of each edge 45 may easily be destroyed or torn. Especially when the machining accuracy of the bent portion is low, excessively strong force is applied to the bent portion, therefore, danger of tear increases.

The present invention may be applied to the disc in which torsion springs operate in one step, or three or more steps. Only one sub-plate 10 may be employed besides the clutch plate 3 or retaining plate 4.

Although the invention has been described in its preferred form with a certain degree of particularity, it is understood that variation of these preferred formed can be made, in their details of construction and the combinations and arrangements of their parts, without departing from the scope of the invention as defined by the following.

We claim:

1. A damper disk comprising a radial flange formed on an outer periphery of a hub splined to an output shaft; a pair of side plates disposed at both sides of the flange; openings formed in the flange and the side plates, said openings registering in the axial direction of the disk; torsion springs disposed in the openings; a stop pin connecting the radially outer portions of the side plates; a sub-plate disposed between the flange and at least one of the side plates; first and second notches formed in the flange and the sub-plate, respectively, through which said pin extends to form first and second spaces disposed respectively therebetween in the rotating direction, the second notch in the sub-plate being shorter than the first notch in the flange; first means frictionally coupling the flange with the sub-plate by a first friction force, and second means frictionally coupling the sub-plate with said one side plate by a second friction force which is weaker than said first friction force.

2. A damper disk according to claim 1, wherein two of said sub-plates are rigidly connected by rivets, and disposed respectively between the flange and both side plates.

3. A damper disk according to claim 2, wherein said torsion springs are arranged to transmit torque between said side plates and said flange, said torsion springs comprise a weak spring and a plurality of strong springs, said weak spring being arranged to transmit torque when the torsion angle is greater and less than a predetermined value, and said stronger springs being arranged to transmit torque only when said torsion angle is greater than said predetermined value.

4. A damper disk according to claim 3, wherein said predetermined value is less than a torsional angle at which second hysteresis torque starts.

5. A damper disk according to claim 1, wherein the damper disk constitutes a friction clutch disk.

* * * * *